(12) United States Patent
Youseph et al.

(10) Patent No.: US 6,543,165 B2
(45) Date of Patent: Apr. 8, 2003

(54) FOLDING TRAFFIC WARNING DEVICE

(76) Inventors: Paul V Youseph, E. 16604 Valleyway, Veradale, WA (US) 99037; Michael D. Small, W. 2015 Decatur Ave., Spokane, WA (US) 99205

(*) Notice: Subject to any disclaimer, the term of this patent is extended or adjusted under 35 U.S.C. 154(b) by 40 days.

(21) Appl. No.: 09/766,929

(22) Filed: Jan. 23, 2001

(65) Prior Publication Data

US 2002/0095841 A1 Jul. 25, 2002

(51) Int. Cl.[7] ............................................. G09F 13/16
(52) U.S. Cl. ........................... 40/610; 40/903; 40/612; 116/63 T
(58) Field of Search ....................... 40/903, 610, 612; 116/63 T

(56) References Cited

U.S. PATENT DOCUMENTS

| | | | | |
|---|---|---|---|---|
| 3,135,235 A | * | 6/1964 | Romano | 116/63 T |
| 3,934,541 A | | 1/1976 | May et al. | 116/63 T |
| D391,881 S | | 3/1998 | Yousepti | D10/114 |

FOREIGN PATENT DOCUMENTS

DE           44 19 554 A1  *  7/1975  ........... G09F/13/16

* cited by examiner

*Primary Examiner*—Cassandra D.
(74) *Attorney, Agent, or Firm*—David S. Thompson

(57) ABSTRACT

A folding traffic-warning device includes an enclosure and enclosure base define first and second ballast compartments, which may be filed with sand, liquid or other material to provide stability during use. A circuit and a battery holder are carried between the first and second ballast compartments. The circuit provides power to a plurality of LEDs carried by a stationary light bar and first and second folding light bars. The folding light bars may be moved between an operational position and a storage position. An axle passing through the enclosure has an upper end attached to the stationary light bar and a lower end attached to a stabilizer bar. In an in-use or operational position, the stabilize bar is oriented perpendicular to the enclosure. In a storage position, the stabilizer bar is oriented parallel to the enclosure.

6 Claims, 7 Drawing Sheets

FOLDING TRAFFIC WARNING DEVICE

CROSS-REFERENCES

There are no applications related to this application filed in this or any foreign country.

BACKGROUND

It is known to use a traffic-warning device in the event of a mechanical breakdown. Simple red or orange triangles are sometimes used, particularly truckers, to indicate to traffic that a disabled truck is ahead. Such traffic warning devices typically include some type of light-reflecting material, which provides some illumination to on-coming traffic.

Unfortunately, such warning triangles are typically very inexpensively constructed, and commonly fall over, rotate into less effective positions or are blown away. Frequently, the devices are put in an area near the flow of traffic, and the air moved by the vehicles passing by will result in the device being knocked down.

Additionally, in the daytime they do not particularly draw attention, and in the nighttime they are visible only briefly as a cars headlights illuminate them. In the twilight hours, when some cars do not have their headlights on, they are of only marginal use.

And still further, known folding traffic warning devices, designed to be folded into a storage position, have failed to provide an effective fastening system to secure the device into the in-use position.

For the foregoing reasons, there is a need for folding traffic warning device that can resist falling over, blowing away and being turned around by wind during use. The folding traffic-warning device must be visible in daylight, twilight,and nighttime, and must be constructed in a manner that allows it to be folded between a storage position and an in-use position that prevents unintentional collapse of the device.

SUMMARY

The present invention is directed to an apparatus that satisfies the above needs. A novel folding traffic-warning device is disclosed that resists falling over, blowing away and being turned around by wind during use. The folding traffic-warning device is visible in daylight, twilight and nighttime, and is constructed in a manner that allows it to be folded between a storage position and an in-use position that prevents unintentional collapse.

The folding traffic-warning device 10 of the present invention provides some or all of the following structures.

(A) An enclosure 50 is carried on an enclosure base 60. The enclosure defines first and second ballast compartments, which may be used to carry sand or similar material as ballast.

(B) A stationary light bar 40 is carried by the upper end of an axle 49 passing through the enclosure and enclosure base, and is typically formed by two translucent halves. The axle allows the stationary light bar to rotate up to 90 degrees with respect to the enclosure. An LED circuit card carries a plurality of LEDs, which produce light viewable through the translucent halves.

(C) A stabilizer bar 100 is carried by a lower end of the axle, in a manner that maintains the stationary light bar and the stabilizer bar in a parallel relationship.

(D) A first end of a first and a second folding light bar 20, 30 is carried by the first and second ends, respectively, of the stationary light bar. The first and second light bars may be moved to a storage position, wherein the light bars are generally parallel to, and on either side of, the stationary light bar. During use, the first and second folding light bars may be moved to an in-use position, wherein the light bars are at roughly a 60 degree angle to the stationary light bar, and the second ends of the light bars are connected.

(E) A circuit 80 is carried within an electrical compartment defined within the enclosure 50. A preferred circuit includes a flasher circuit and a plurality of LEDs distributed within the stationary light bar and the first and second folding light bars. A preferred flasher circuit includes sufficient transistors, resistors and capacitors, or circuit equivalents, to result in a continuous cycle of power, on and off, to the LEDs at a rate of one or two seconds per cycle.

(F) A battery holder 90 is easily attached to, and removed from, the enclosure. When attached to the enclosure, the circuit is powered, and the LEDs are operational.

It is therefore a primary advantage of the present invention to provide a novel folding traffic warning device that resists falling over, blowing away and being turned around by wind during use, and which includes an enclosure having first and second ballast compartments for the addition of sand or other ballast to prevent unwanted movement of the device.

Another advantage of the present invention is to provide a novel folding traffic warning device that includes first and second light bars that are movable between a storage position and an in-use position, wherein the light bars are sufficiently resiliently deformable to result in a bias that aids in the maintenance of a connection between the second ends of each when in the in-use configuration.

A still further advantage of the present invention is to provide a novel folding traffic warning device that includes an LED circuit card carried within the first and second folding light bars and the stationary light bar, wherein each LED circuit card defines a plurality of LED holes which allow each LED to produce light visible from both sides of each light bar.

Other objectives, advantages and novel features of the invention will become apparent to those skilled in the art upon examination of the specification and the accompanying drawings.

DRAWINGS

These and other features, aspects, and advantages of the present invention will become better understood with regard to the following description, appended claims, and accompanying drawings where:

DESCRIPTION

Figure 1:
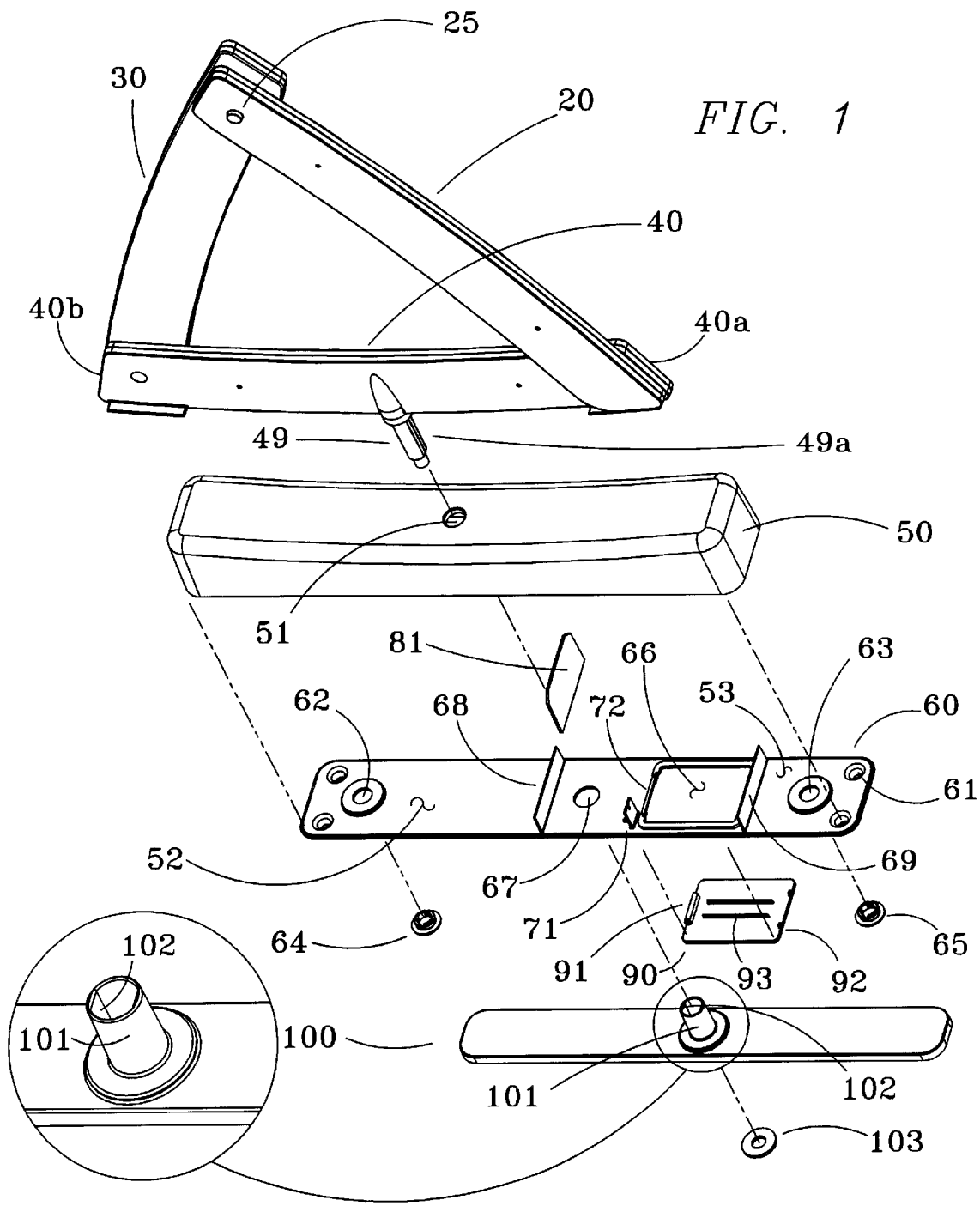
FIG. 1 is an exploded isometric view of a version of the folding traffic warning device constructed in accordance with the principles of the invention.
Figure 2:
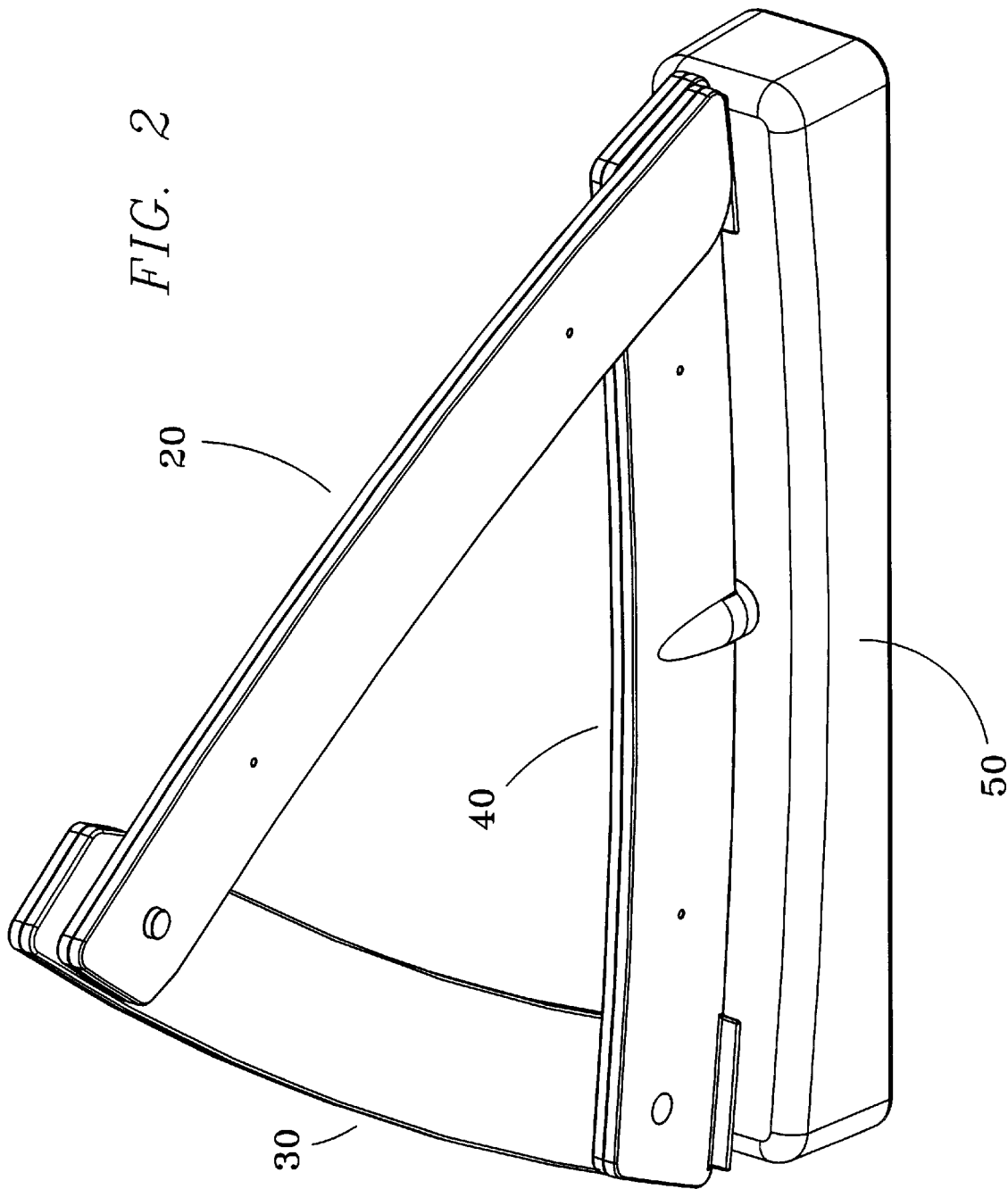
FIG. 2 is an assembled isometric view of the device of FIG. 1, wherein the first and second folding light bars are ready to be flexed for attachment together of their second ends.
Figure 3:
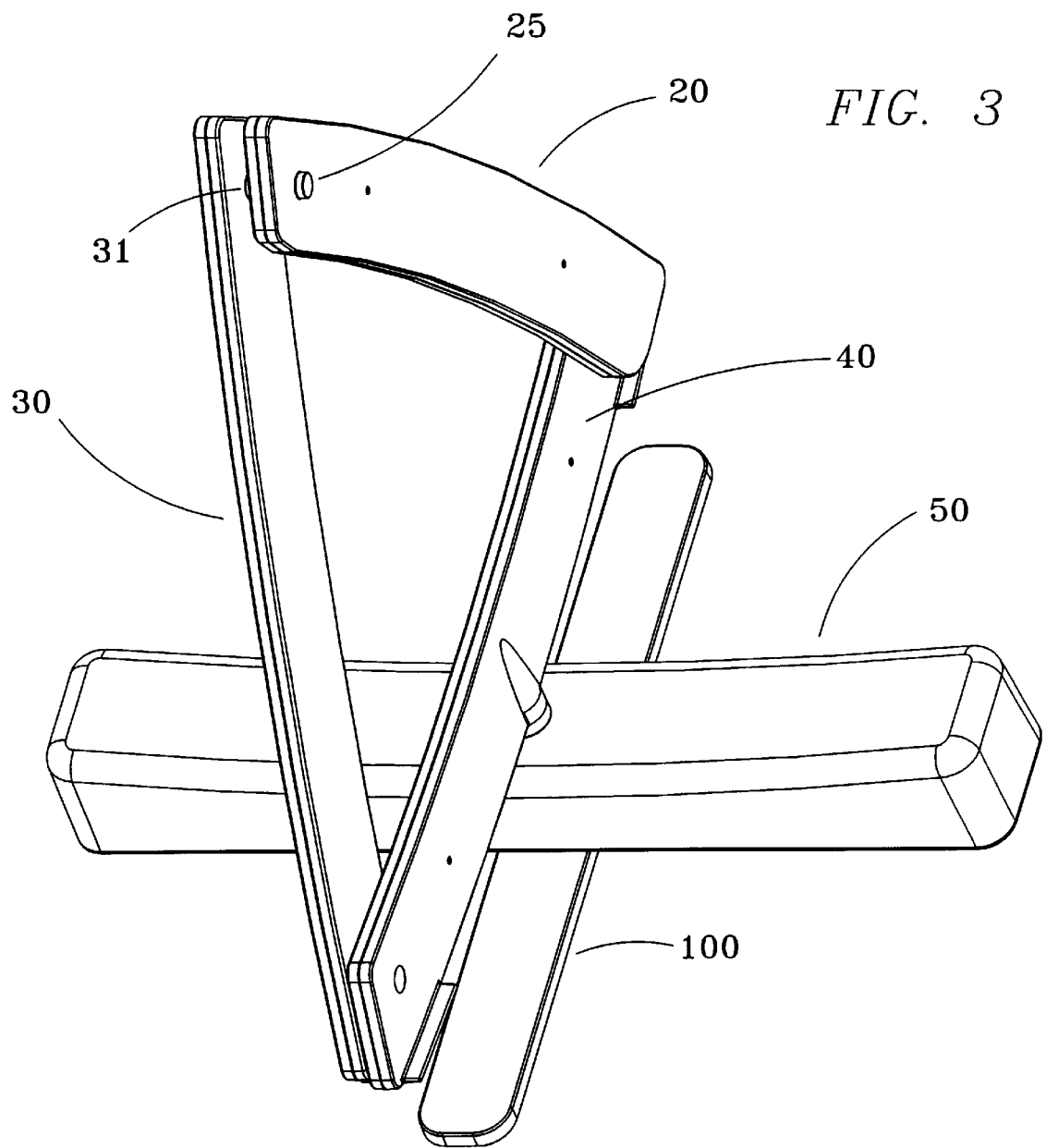
FIG. 3 is a isometric view of the device of FIG. 2, wherein the enclosure has been rotated 90 degrees with respect to the stationary light bar and the stabilizer bar.
Figure 4:
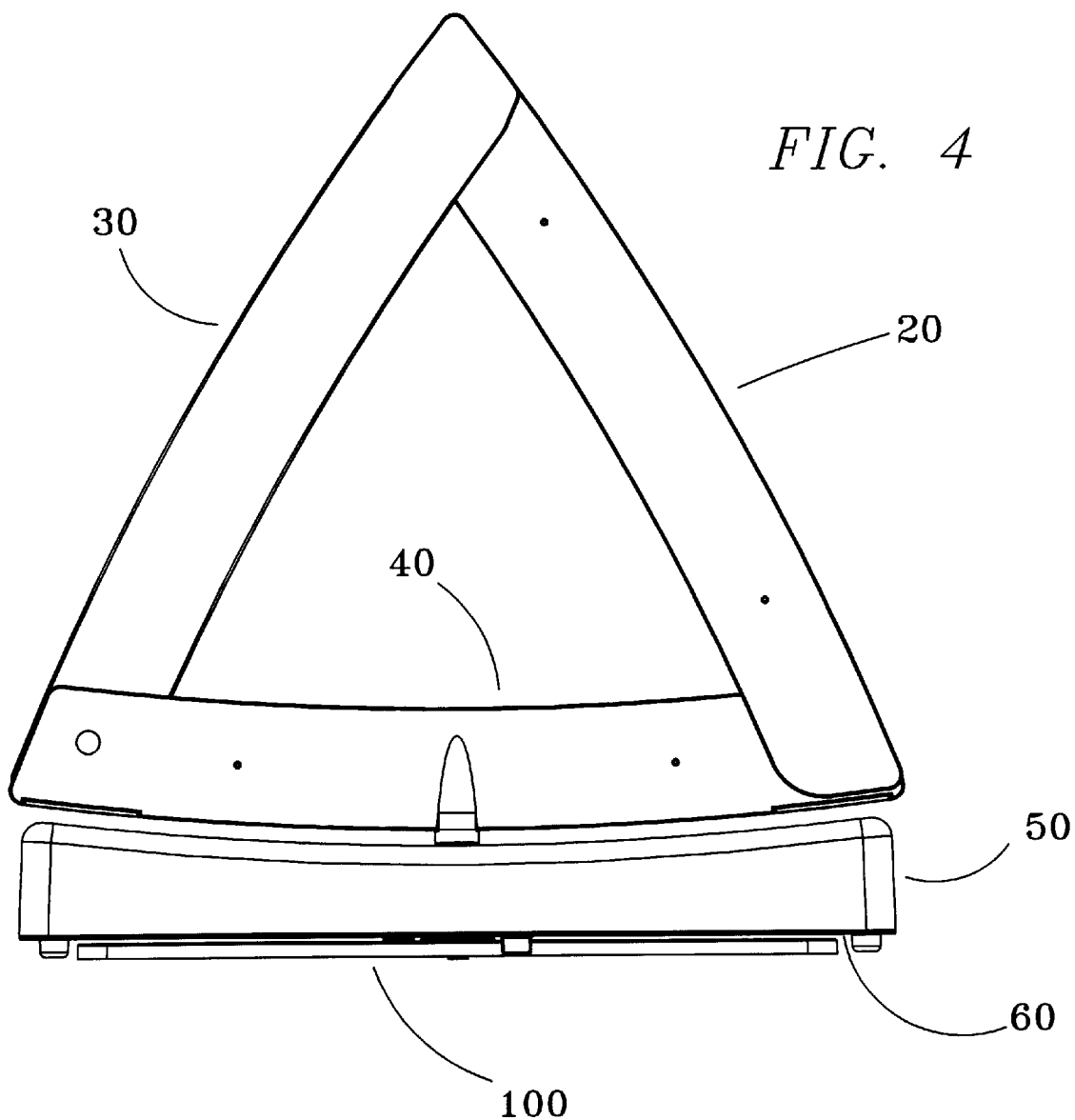
FIG. 4 is an orthographic view of the device of FIG. 2, wherein the folding light bars have been attached at an upper point.
Figure 8:
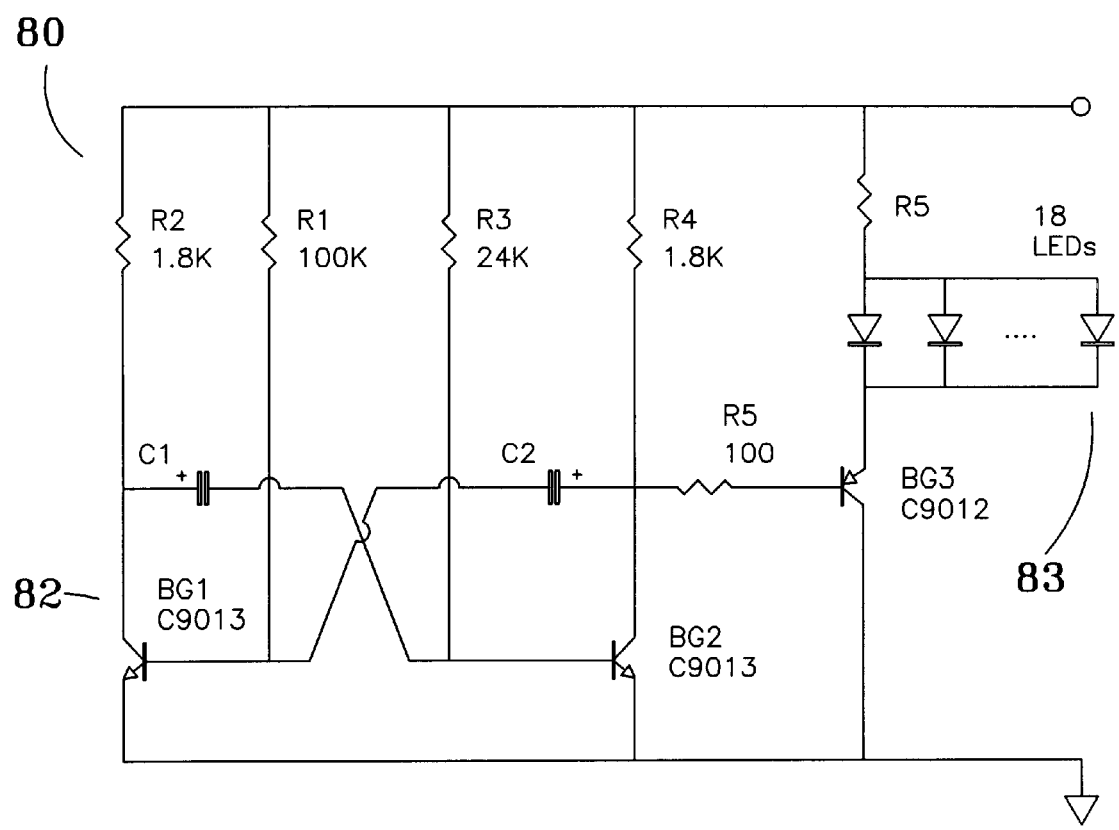
FIG. 8 is a schematic view of a preferred electrical circuit compatible with the folding traffic warning device of FIG. 1.
Figure 5:
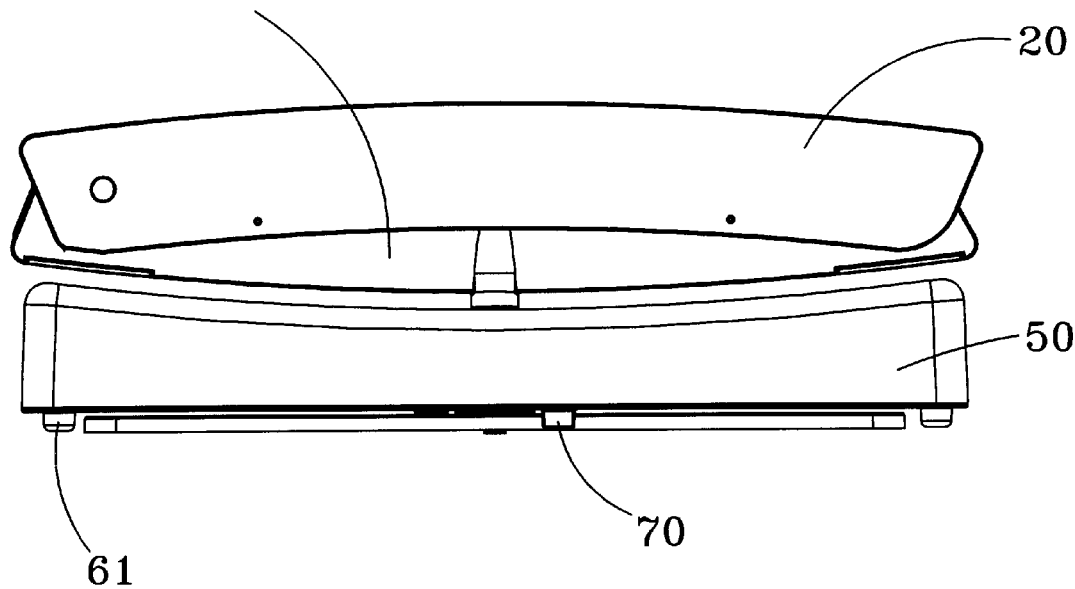
FIG. 5 is an orthographic view of the device of FIG. 2, wherein the folding light bars have been folded into the storage position.

Referring in generally to FIGS. 1 through 8, a folding traffic-warning device 10 constructed in accordance with the principles of the invention is seen. An enclosure 50 and enclosure base 60 define first and second ballast compartments, which may be filed with sand, liquid or other material to provide stability during use. A circuit 80 and battery holder 90 are carried between the first and second ballast compartments. The circuit provides power to a plurality of LEDs carried by a stationary light bar 40 and first and second folding light bars 20, 30. The folding light bars may be moved between an operational position as seen in FIG. 4, and a storage position, seen in FIG. 5. As seen in the exploded view of FIG. 1, an axle passing through the enclosure has an upper end attached to the stationary light bar and a lower end attached to a stabilizer bar 100. As seen in FIG. 3, in an in-use or operational position, the stabilize bar is oriented perpendicular to the enclosure. In a storage position, the stabilizer bar is oriented parallel to the enclosure, as seen in FIG. 5.

As seen in FIGS. 1–5, an enclosure 50 is carried on an enclosure base 60. The enclosure defines first and second ballast compartments 52, 53, which may be used to carry sand or similar material as ballast. An electrical compartment 54, defined between the two ballast compartments, carries the circuit board 81. A hole 51 is defined through the enclosure, which allows passage of the axle 49.

Referring in particular to FIGS. 1 and 5, an enclosure base 60 is attached to the lower perimeter of the enclosure 50. Four feet 61 are positioned substantially in the corners of the lower surface of the enclosure base, and support the base in use. First and second holes 62, 63 are defined in the base, and allow access to the first and second ballast compartments 52, 53. A recessed shoulder forming the perimeter of each hole allows the first and second plugs 64, 65 to be consistent with the planar lower surface of the enclosure base. An opening 66 is defined for the battery holder 90. A hole 67, defined through the enclosure base, has a diameter incrementally greater than the outside diameter of the axle 49. Continuing to refer to FIG. 1, dividers 68, 69 separate the first and second ballast compartments 52, 53 from the electrical compartment 54. A strain relief structure 71 supports a wire extending from the battery compartment to the circuit card. A connector 72 engages the connector 91, allowing attachment of the battery holder 90.

Referring to FIG. 5, first and second stops 70 prevent over-rotation of the stabilizer bar 100.

As seen in FIGS. 1 through 7, a stationary light bar 40 is carried by the upper end of an axle 49 passing through the enclosure 50 and enclosure base 60. In a manner similar to the folding light bars, the stationary light bar is typically formed by two translucent halves 41, 42. A connector 43 secures the halves together. Pivoting connectors 44, 45 carry the inner ends of the first and second folding light bars, respectively.

The axle allows the stationary light bar to rotate up to 90 degrees with respect to the enclosure. An LED circuit card carries a plurality of LEDs, which produce light viewable through the translucent halves.

Figure 6:
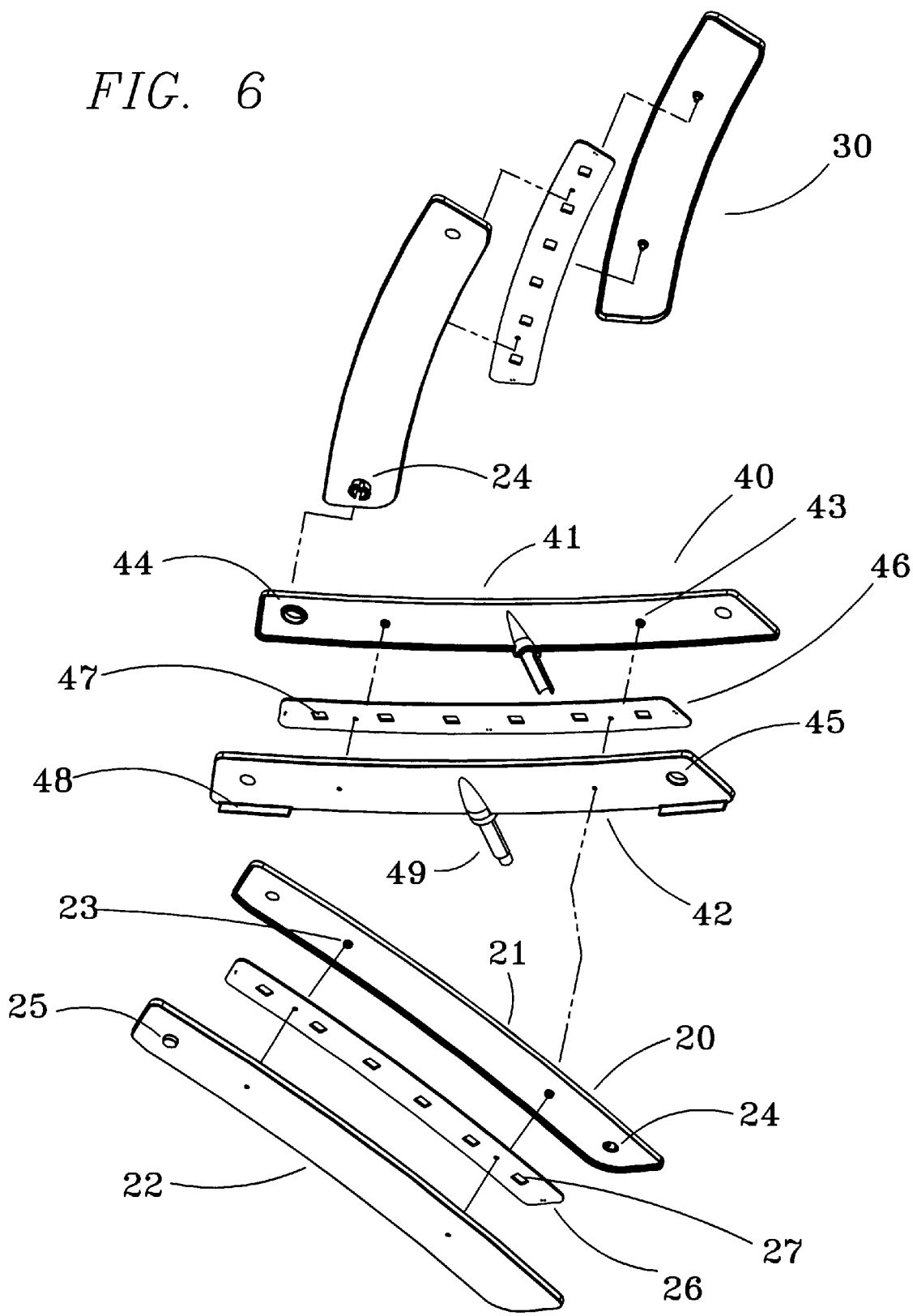
FIG. 6 is an isometric view of the light bars in a fully exploded configuration.
Figure 7:
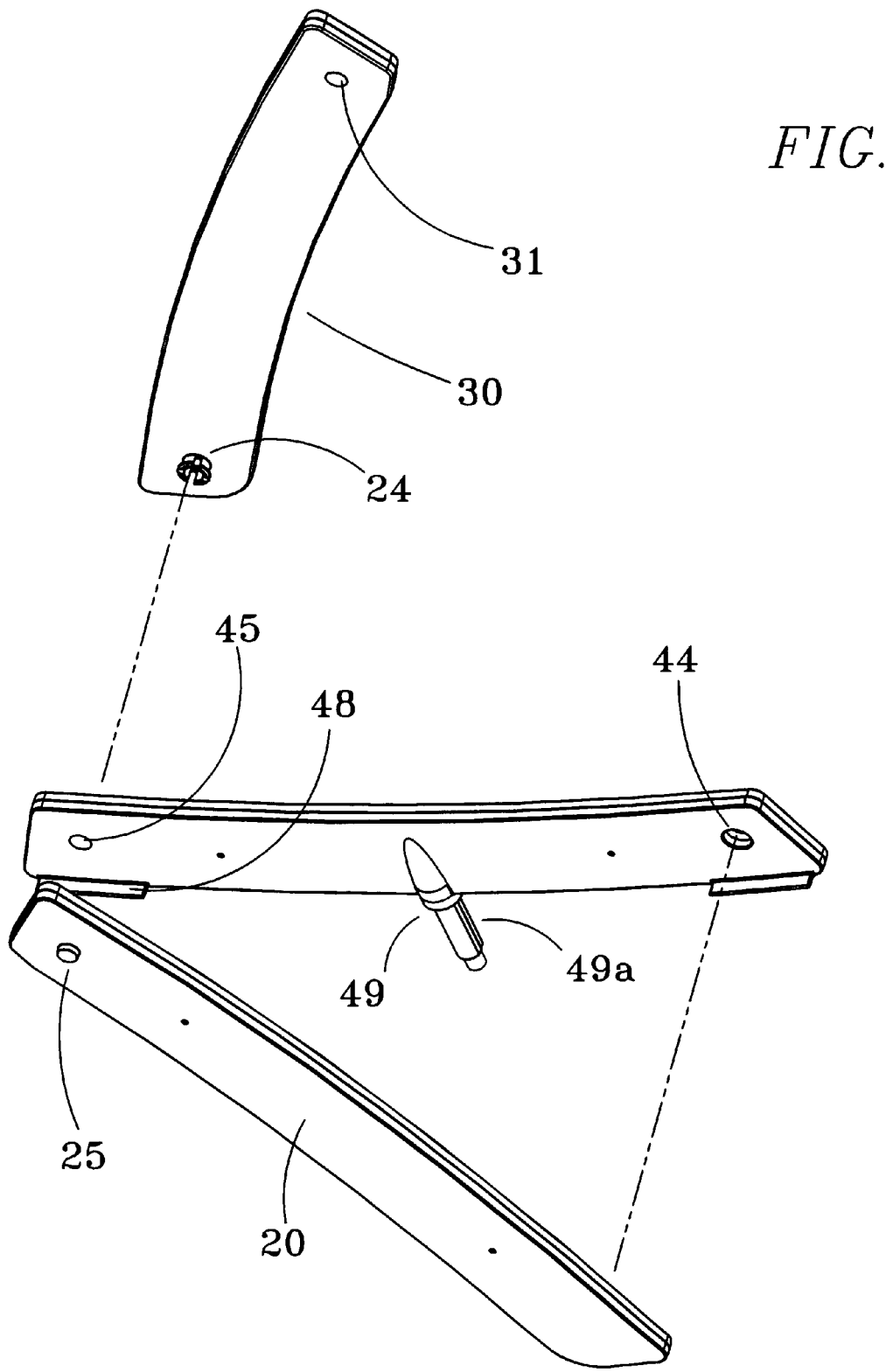
FIG. 7 is an isometric view of the light bars in a partially exploded configuration.

As seen in FIG. 6, an LED circuit card 46 is carried between the first and second halves 41, 42. A plurality of LED cut outs 47, typically six, are defined in the circuit card. The LED cut outs allow light emitted from each LED to be directed in both directions; i.e., light passes through both halves.

As seen particularly in FIGS. 1 and 2, a support shelf 48 carries the outer end of each folding light bar when in the storage position.

A stabilizer bar 100 is carried by a lower end of the axle, in a manner that maintains the stationary light bar and the stabilizer bar in a parallel relationship during rotation. As seen in FIGS. 2, 4 and 5, when the folding traffic-warning device 10 is in a storage position, the stabilizer bar is parallel to the enclosure 50. As seen in FIG. 3, when the device 10 is in the in-use position, the stabilizer bar is perpendicular to the enclosure.

Referring particularly to FIG. 1, it can be seen that the stabilizer bar includes an elongated body 101 having a flat-keyed portion 102, which mates with the flat-keyed portion 49a of the axle 49. A connector 103 fastens to the lower end of the axle, retaining the stabilizer bar on the axle.

A first end of similar first and second folding light bars 20, 30 is carried by the first and second ends, 40a, 40b, respectively, of the stationary light bar 40. In a preferred embodiment, each folding light bar is formed of first and second halves 21, 22, typically made of resilient plastic that is translucent in nature. In a typical application, a red or orange color is used. Light from the LEDs is able to pass through the halves without excessive loss of brilliance. The first and second halves snap together and are held in place by connectors 23.

As seen in FIG. 5, the first and second folding light bars may be moved to a storage position, wherein the light bars are generally parallel to, and on either side of, the stationary light bar 40. In this position, the folding light bars are in a relaxed, as opposed to a stressed or biased, condition.

When needed, the first and second folding light bars may be pivoted with respect to first and second ends of the stationary light bar. As seen particularly in FIGS: 6 and 7, a connector 24 carried by an inner end of each folding light bar allows rotation with respect to connectors 44, 45 carried by opposite ends of the stationary light bar. Once pivoted to an in-use or operational position, wherein the folding light bars are at roughly a 60-degree angle to the stationary light bar, the first and second folding light bars assume a position similar to that illustrated in FIGS. 2 and 3. In this position, the first folding light bar, second folding light bar, and stationary light bar 40 form a triangular pattern.

The first and second folding light bars are sufficiently resiliently deformable to allow the outside surfaces 28 of the outer ends to be connected. As seen in FIG. 6, a connector 25 carried by the first folding light bar, is sized for connection to a socket 31, defined on the outside surface of the second light bar 30. Each folding light bar must be flexed somewhat, so that the outside surfaces come into contract, and the fasteners 25, 31 attached.

As seen in FIG. 6, an LED circuit card 26 is carried between the first and second halves 21, 22 or each folding light bar. A plurality of LED cut outs 27, typically six, are defined in each circuit card. The LED cut outs allow light emitted from each LED to be directed in both directions; i.e., light passes through both halves 21, 22.

A circuit 80 is carried on a circuit board 81, carried within the electrical compartment 54 defined within the enclosure 50. A preferred circuit includes a flasher circuit 82, which may include a pair of switching transistors that turn on and off in response to the voltage potential on associated capacitors. A further switching transistor turns-on an off a plurality of LEDs 83. The LEDs are distributed within the stationary light bar and the first and second folding light bars. A preferred flasher circuit includes sufficient transistors, resistors and capacitors, or circuit equivalents, to result in a continuous cycle of power, on and off, to the LEDs at a rate of one or two seconds per cycle.

As seen in FIG. 1, a battery holder 90 is easily attached to, and removed from, the enclosure. When attached to the enclosure, the circuit is powered, and the LEDs are operational. Hinge clips 92 engage the perimeter of the opening 66 for the battery holder, and a connector 91 fastens the battery holder to the base enclosure. Battery separators 93 maintain the battery orientation.

The previously described versions of the present invention have many advantages, including a primary advantage of providing a novel folding traffic warning device that resists falling over, blowing away and being turned around by wind during use, and which includes an enclosure having first and second ballast compartments for the addition of sand or other ballast to prevent unwanted movement of the device.

Another advantage of the present invention is to provide a novel folding traffic warning device that includes first and second light bars that are movable between a storage position and an in-use position, wherein the light bars are sufficiently resiliently deformable to result in a bias that aids in the maintenance of a connection between the second ends of each when in the in-use configuration.

A still further advantage of the present invention is to provide a novel folding traffic warning device that includes an LED circuit card carried within the first and second folding light bars and the stationary light bar, wherein each LED circuit card defines a plurality of LED holes which allow each LED to produce light visible from both sides of each light bar.

Although the present invention has been described in considerable detail and with reference to certain preferred versions, other versions are possible. For example, while a preferred circuit, having a preferred number of LEDs was disclosed, some modification to the circuit and to the number of LEDs could be made, while still in keeping with the teachings of the invention. Therefore, the spirit and scope of the appended claims should not be limited to the description of the preferred versions disclosed.

In compliance with the U.S. Patent Laws, the invention has been described in language more or less specific as to methodical features. The invention is not, however, limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A folding traffic warning device, comprising:
   (A) an enclosure carried on an enclosure base, defining first and second ballast compartments;
   (B) an axle passing through the enclosure and enclosure base;
   (C) a stationary light bar, carried by an upper end of the axle, comprising:
   (D) a stabilizer bar, attached to a lower end of the axle;
   (E) a first folding light bar, having a first end attached to a first end of the stationary light bar;
   (F) a second folding light bar, having a first end attached to a second end of the stationary light bar;
   (G) whereby the first and second folding light bars are sufficiently resiliently deformable to allow first and second connectors to be mated, thereby holding the first and second folding light bars in an in-use position;
   (H) a circuit, carried within an electrical compartment defined within the enclosure, comprising flashing means for cycling power on and off to a plurality of LEDs; and
   (I) a battery holder attachable to, and removed from, the enclosure, carrying at least one battery in communication with the circuit.

2. The folding traffic warning device of claim 1, wherein the stationary light bar comprises:
   (a) an elongated body comprising first and second translucent halves;
   (b) an LED circuit card, carried between the two translucent halves, the LED circuit card defining a plurality of holes; and
   (c) an LED associated with each of the plurality of holes, whereby light emitted from the LED passes through each of the two translucent halves.

3. The folding traffic warning device of claim 1, wherein the stabilizer bar comprises:
   (a) an elongated body;
   (b) a collar, defining the perimeter of a hole passing through the elongated body, the collar having diametrically opposed flat keyed portions in contact with a flat keyed portion of the axle, whereby rotation of the stationary light bar is in unison with rotation of the stabilizer bar; and
   (c) a connector, secured to a lower end of the axle.

4. The folding traffic warning device of claim 1, wherein the first folding light bar comprises:
   (a) an elongated body comprising first and second translucent halves;
   (b) an LED circuit card, carried between the two translucent halves, the LED circuit card defining a plurality of holes;
   (c) an LED associated with each of the plurality of holes, whereby light emitted from the LED passes through each of the two translucent halves;
   (d) a pivoting connector carried by a first end of the elongated body, connected to a first end of the elongated body of the stabilizer bar, whereby the first folding light bar may be pivoted between a storage position and an in-use position; and
   (e) a first connector carried by an outside surface of a second end of the elongated body.

5. The folding traffic warning device of claim 1, wherein the second folding light bar comprises:
   (a) an elongated body comprising first and second translucent halves;
   (b) an LED circuit card, carried between the two translucent halves, the LED circuit card defining a plurality of holes;
   (c) an LED associated with each of the plurality of holes, whereby light emitted from the LED passes through each of the two translucent halves;
   (d) a pivoting connector carried by a first end of the elongated body, connected to a second end of the elongated body of the stabilizer bar, whereby the second folding light bar may be pivoted between a storage position and an in-use position; and (e) a second connector carried by an outside surface a second end of the elongated body.

6. A folding traffic warning device, comprising:

(A) an enclosure carried on an enclosure base, defining first and second ballast compartments;

(B) an axle passing through the enclosure and enclosure base;

(C) a stationary light bar, carried by an upper end of the axle, comprising:
   (a) an elongated stationary light bar body comprising first and second translucent halves;
   (b) an LED circuit card, carried between the two translucent halves, the LED circuit card defining a plurality of holes; and
   (c) an LED associated with each of the plurality of holes in the stationary light bar, whereby light emitted from the LED passes through each of the two translucent halves;

(D) a stabilizer bar, comprising:
   (a) an elongated stabilizer bar body;
   (b) a collar, defining a perimeter of a hole passing through the elongated stabilizer bar body, the collar having diametrically opposed flat keyed portions in contact with a flat keyed portion of the axle, whereby rotation of the stationary light bar is in unison with rotation of the stabilizer bar; and
   (c) a connector, secured to a lower end of the axle;

(E) a first folding light bar, comprising:
   (a) a first elongated body comprising first and second translucent halves;
   (b) a first LED circuit card, carried between the two translucent halves, the first LED circuit card defining a plurality of holes in the first folding light bar;
   (c) an LED associated with each of the plurality of holes, whereby light emitted from the LEDS passes through each of the two translucent halves of the first elongated body;
   (d) a pivoting connector carried by a first end of the first elongated body, connected to a first end of the first elongated body of the stabilizer bar, whereby the first folding light bar may be pivoted between a storage position and an in-use position; and
   (e) a first connector carried by an outside surface of a second end of the first elongated body;

(F) a second folding light bar, comprising:
   (a) a second elongated body comprising first and second translucent halves;
   (b) an LED circuit card, carried between the two translucent halves, the LED circuit card defining a plurality of holes;
   (c) a second LED associated with each of the plurality of holes in the second folding light bar, whereby light emitted from the LEDs passes through each of the two translucent halves of the second elongated body;
   (d) a pivoting connector carried by a first end of the second elongated body, connected to a second end of the second elongated body of the stabilizer bar, whereby the second folding light bar may be pivoted between a storage position and an in-use position; and
   (e) a second connector carried by an outside surface a second end of the second elongated body;

(G) whereby the first and second folding light bars are sufficiently resiliently deformable to allow the first and second connectors to be mated, thereby holding the first and second folding light bars in an in-use position;

(H) a circuit, carried within an electrical compartment defined within the enclosure, comprising flashing means for cycling power on and off to the plurality of LEDs; and (I) a battery holder attachable to, and removed from, the enclosure, carrying at least one battery in communication with the circuit.

* * * * *